United States Patent
Sidhom

(10) Patent No.: US 10,528,065 B1
(45) Date of Patent: Jan. 7, 2020

(54) AUTOMATED FLUID FLOW CONTROL SYSTEM WITH ACCELERATED SPEED OF RESPONSE

(71) Applicant: Samir Alexander Sidhom, St. Louis Park, MN (US)

(72) Inventor: Samir Alexander Sidhom, St. Louis Park, MN (US)

(*) Notice: Subject to any disclaimer, the term of this patent is extended or adjusted under 35 U.S.C. 154(b) by 114 days.

(21) Appl. No.: 15/685,537

(22) Filed: Aug. 24, 2017

(51) Int. Cl.
    *F16K 31/12* (2006.01)
    *G05D 7/06* (2006.01)

(52) U.S. Cl.
    CPC .......... *G05D 7/0676* (2013.01); *G05D 7/0635* (2013.01); *Y10T 137/7761* (2015.04)

(58) Field of Classification Search
    CPC ................................................ Y10T 137/7761
    See application file for complete search history.

(56) References Cited

U.S. PATENT DOCUMENTS

| | | | | |
|---|---|---|---|---|
| 4,375,224 A | * | 3/1983 | Noll | F24F 11/745 137/486 |
| 4,581,707 A | * | 4/1986 | Millar | G01F 1/00 702/47 |
| 5,090,303 A | * | 2/1992 | Ahmed | B08B 15/023 454/238 |
| 5,123,592 A | * | 6/1992 | Desmarais | F24F 11/04 137/486 |
| 5,215,497 A | | 6/1993 | Drees | |
| 5,518,446 A | * | 5/1996 | Jacob | B08B 15/023 137/486 |
| 5,532,922 A | * | 7/1996 | Wacker | G05B 13/0265 700/282 |
| 6,250,560 B1 | | 6/2001 | Kline et al. | |
| 9,665,105 B2 | * | 5/2017 | Someya | G05D 7/0635 |
| 2008/0207402 A1 | | 8/2008 | Fisher et al. | |

\* cited by examiner

*Primary Examiner* — Robert K Arundale
(74) *Attorney, Agent, or Firm* — Donald J. Ersler

(57) ABSTRACT

An automated fluid flow control system with accelerated speed of response includes a programmable controller and a flow control device. The programmable controller includes a look-up table and a fine-adjustment software routine. The flow control device may be an angularly adjustable damper in a duct or a fan blower in a duct. A rotation device is used to rotate the damper blade. The rotation device rotates the damper blade to a specific angle according to a control signal value, which is associated with a fluid flow rate. The angle of the damper blade is associated with a fluid flow rate in the duct by sampling flow rate during commissioning. The fine-adjustment software routine includes sampling the fluid flow rate and increasing or decreasing the control signal value to obtain the desired fluid flow rate with the flow control device. A motor drive controller is used to drive the fan blower.

15 Claims, 2 Drawing Sheets

AUTOMATED FLUID FLOW CONTROL SYSTEM WITH ACCELERATED SPEED OF RESPONSE

BACKGROUND OF THE INVENTION

1. Field of the Invention

The present invention relates generally to controlling the flow rate of a fluid in a duct and more specifically to an automated fluid flow control system with accelerated speed of response, which includes increasing the speed of response and accuracy when setting a new flow rate.

2. Discussion of the Prior Art

U.S. Pat. No. 5,215,497 to Drees discloses a fume hood controller. U.S. Pat. No. 6,250,560 to Kline et al. discloses a variable-air-volume diffuser actuator assembly and method. Patent publication no. 2008/0207402 to Fisher et al. discloses a closed-loop power dissipation control for cardio-fitness equipment.

Accordingly, there is a clearly felt need in the art for an automated fluid flow control system with accelerated speed of response, which quickly and immediately changes the flow of a fluid to a new flow rate, then utilizes feedback from a flow measuring device to correct for any differences between actual and desired flow rates.

SUMMARY OF THE INVENTION

The present invention provides an automated fluid flow control system with accelerated speed of response (automated fluid flow system), which rapidly adjusts fluid flow to a desired flow rate by utilizing reference data that equates various control signals to flow rates, then makes adjustments to correct for differences between actual and desired flow rates via a closed loop control system to adjust for flow anomalies such as increased flow pressure. The term "reference data" (sometimes referred to as a "look-up table") is used within this application to refer to the storage of flow data relative to control output and includes arrays, data bases, and other methods of storing or deriving flow data relative to control output. The automated fluid flow system preferably includes a programmable controller and a flow control device. The programmable controller includes reference data that preferably includes a plurality of fluid flow rates associated with a plurality of control single values, or any variation thereof. After a period of time, the fluid flow rate is then fine tuned by using flow feedback to adjust for variances between a desired fluid flow rate and an actual fluid flow rate.

The flow control device may be an angularly adjustable damper in a duct, a fan blower in a duct, or any other suitable method of controlling the flow rate of a fluid. The damper blade may be fully closed or fully opened in the duct. An angle of the damper blade controls a fluid flow rate (such as air) in the duct. A rotation device, such as a modulating rotary actuator is used to rotate the angle of the damper blade. The damper blade is attached to an output shaft of the rotation device. The rotation device rotates the damper blade to a specific angle per a specific control output (i.e. voltage, amperage, mechanical, etc), which is associated with a fluid flow rate table, array, or database that associates a control output to a fluid flow rate. A specific value of voltage output, or other control signal, from the programmable controller is associated with a specific fluid flow rate generated by the angle of the damper blade. The angle of the damper can be associated with a fluid flow rate in the duct by sampling the fluid flow to set a control signal value relationship during commissioning of the automated fluid flow system. A desired flow rate can be entered into the programmable controller through a controller entry device. Fluid flow rate data in the programmable controller directs an output of a specific control signal value to the rotation device.

A speed of the fan blower generates a particular flow rate of fluid in the duct. The fan blower includes a fan motor and fan blades. A variable frequency drive is preferably used to drive the fan motor, but other types of motor drive controllers may also be used. An output signal from the motor drive controller controls the speed of the fan motor. A particular speed of the fan blower generates a particular fluid flow rate. A specific control signal value from the programmable controller is associated with a specific fluid flow rate generated by the fan blades. A specific control signal value from the programmable controller is associated with a specific fluid flow rate generated by a speed of the motor. The speed of the fan blades can be associated with a fluid flow rate in the duct by testing during commissioning of the quick adjusting damper device to populate a look-up table in the programmable controller. A desired flow rate can be entered into the programmable controller through a controller entry device. The look-up table directs the programmable controller to output a specific control signal value to the motor drive controller.

The fine-adjustment loop routine (i.e. closed control loop or other) may include sampling of the fluid flow rate to confirm that the control signal value from output table produced the desired flow rate. The control signal value will be increased or decreased if desired flow rate does not obtain the desired fluid flow rate with the flow control device. A fluid flow rate sensor, such as a differential pressure sensor, measures the fluid flow rate in the duct. The differential pressure sensor outputs a value of fluid flow rate to the programmable controller. If the fluid flow rate is correct, no further adjustment to the control signal value is needed. If the flow rate is incorrect, then a closed loop routine in the programmable controller is used to increase or decrease the control signal value to obtain the correct fluid flow rate value.

Accordingly, it is an object of the present invention to provide an automated fluid flow system, which quickly and immediately changes the flow of a fluid to a new flow rate, then utilizes feedback from a fluid flow rate sensor to fine tune the control signal value if there is a difference between actual and desired flow rates.

DETAILED DESCRIPTION OF THE PREFERRED EMBODIMENTS

Figure 1:
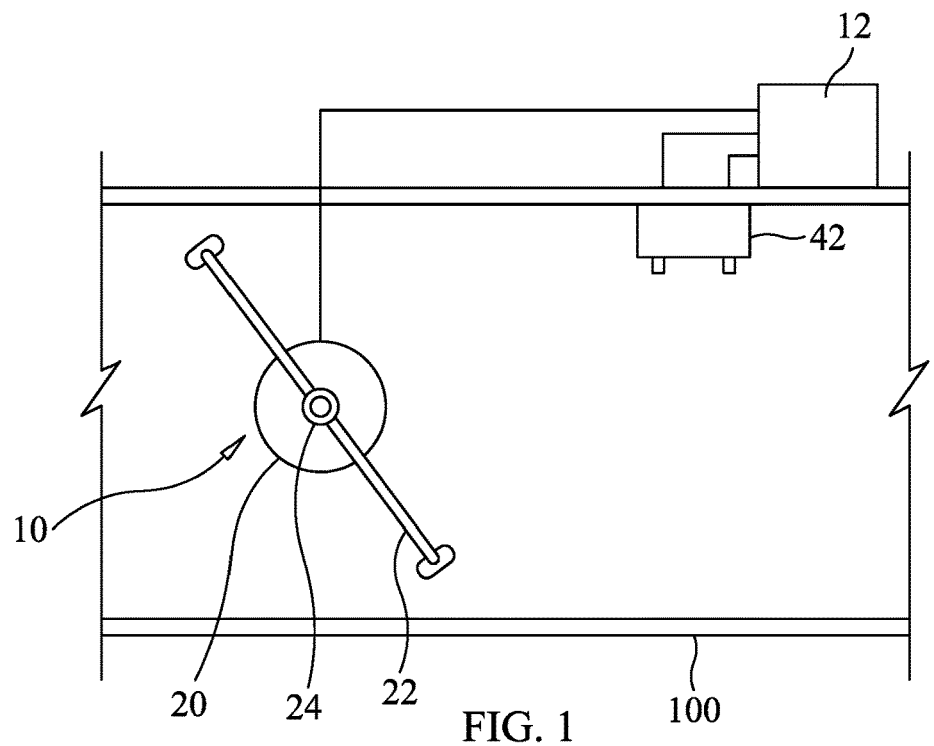
FIG. 1 is a cross sectional view of an angularly adjustable damper blade in a duct, which is used to control a fluid flow rate in the duct of an automated fluid flow system in accordance with the present invention.
Figure 3:
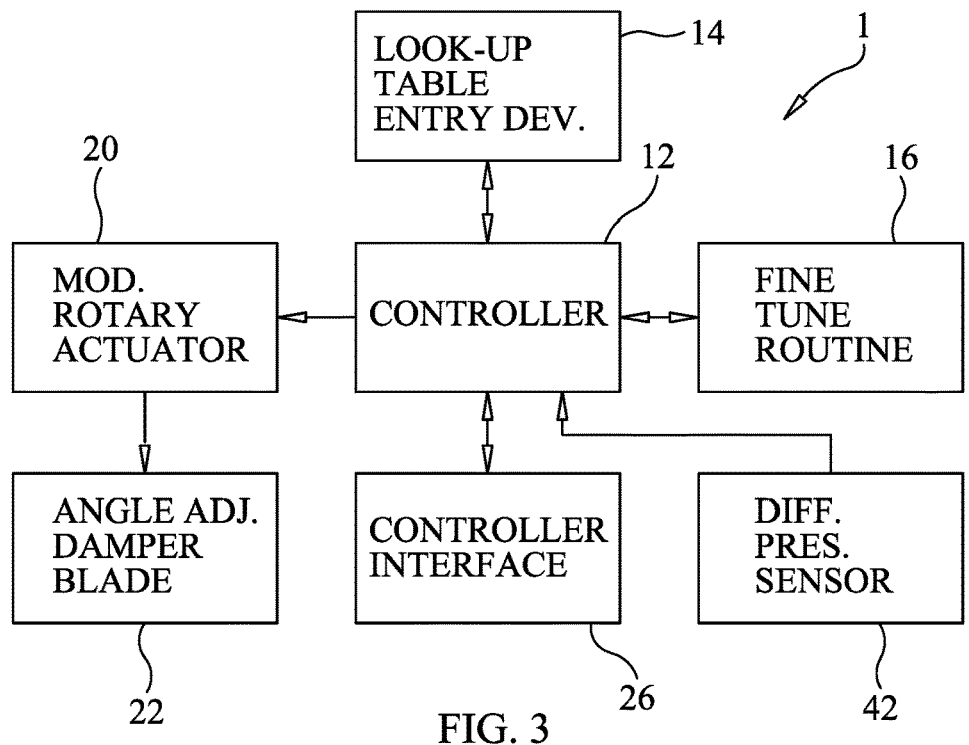
FIG. 3 is a schematic diagram of an automated fluid flow system with an angularly adjustable damper blade in accordance with the present invention.

With reference now to the drawings, and particularly to FIGS. 1 and 3, there is shown a cross sectional view of a duct 100 with an angular adjustable damper 10 contained therein of an automated fluid flow system 1. The automated fluid flow system 1 preferably includes the angularly adjustable damper 10 and a programmable controller 12. The programmable controller 12 is preferably any suitable microprocessor based device, but other devices could also be used. The programmable controller 12 includes a look-up table 14 or other data that relates fluid flow rate to a control signal value; and a fine-adjustment software loop routine 16. The angularly adjustable damper 10 is retained in the duct 100. The angularly adjustable damper 10 includes a rotation device 20 and an angularly adjustable damper blade 22. The rotation device 20 is preferably modulating rotary actuator, but other rotation devices may also be used. The damper blade 22 may be fully closed or fully opened in the duct 100. An angle of the damper blade 22 controls the flow rate of a fluid (such as air) in the duct 100. The rotation device 20 is used to rotate an angle of the damper blade 22. The damper blade 22 is attached to an output shaft 24 of the rotation device 20. The rotation device 20 rotates the damper blade 22 to a specific angle according to a specific control signal value, which is associated with a specific fluid flow rate. The look-up table 14 associates a specific control signal value to a specific fluid flow rate. The specific control signal value from the programmable controller 12 is associated with the specific fluid flow rate generated by an angle of the damper blade 22. The angle of the damper blade 22 is associated with fluid flow rates in the duct 100 by sampling the fluid flow rates at different control signal values during commissioning of the automated fluid flow system 1 to populate the look-up table 14. A desired flow rate is entered into the programmable controller 12 through a controller interface 26, the look-up table 14 directs the programmable controller 12 to output the corresponding control signal value to the rotation device 20.

Figure 2:
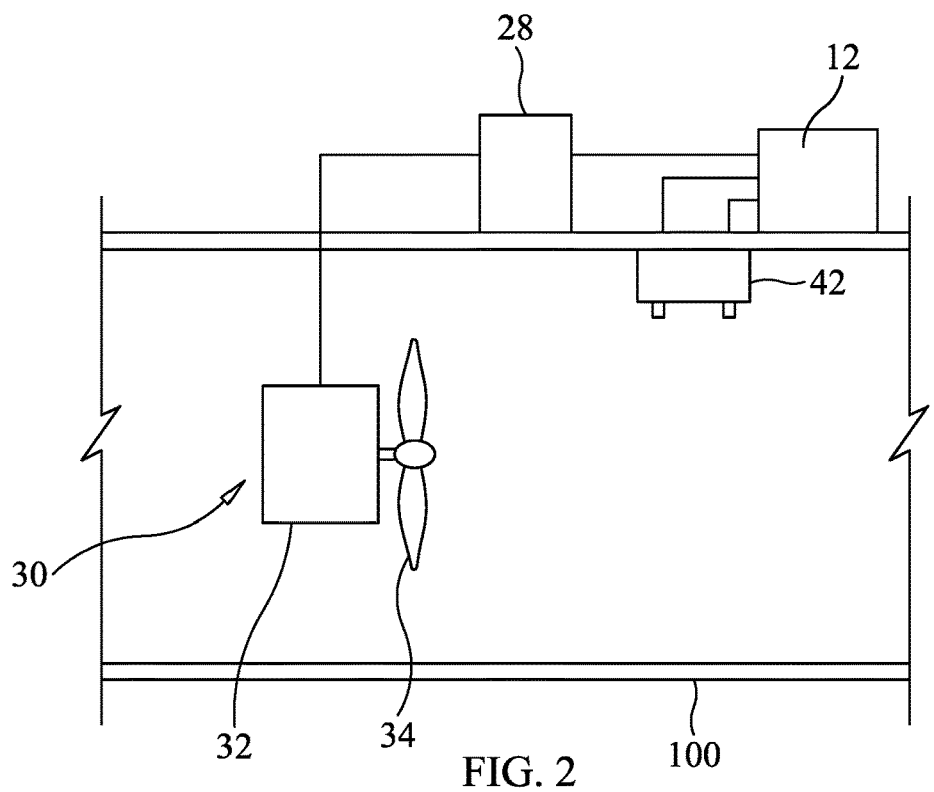
FIG. 2 is a cross sectional view of a blower fan in a duct, which is used to control a fluid flow rate in the duct of an automated fluid flow system in accordance with the present invention.
Figure 4:
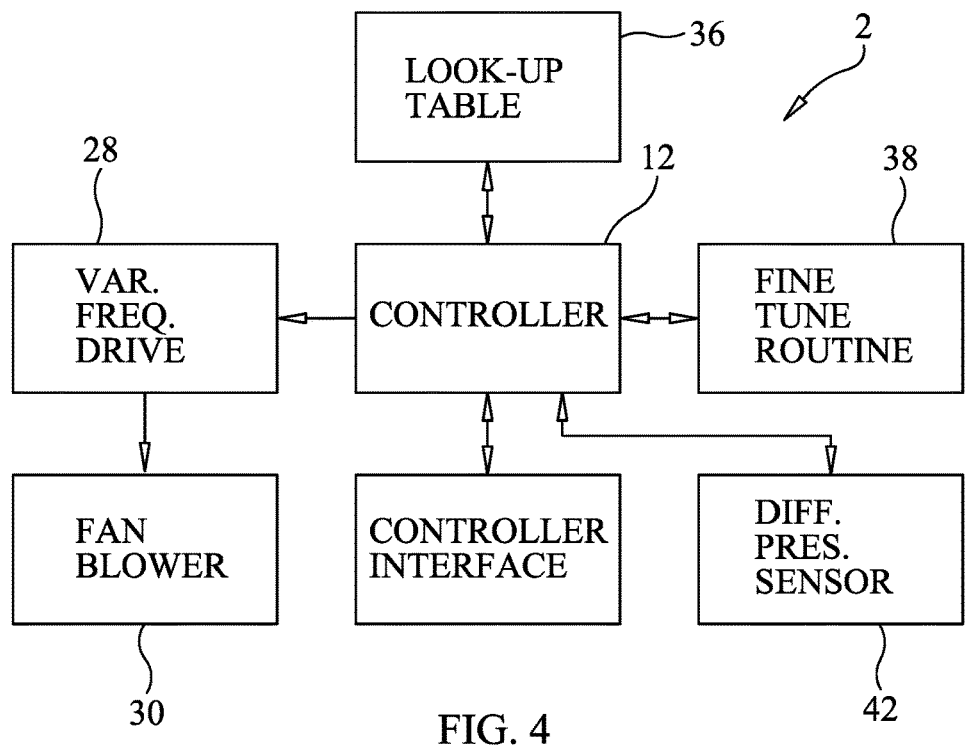
FIG. 4 is a schematic diagram of an automated flow system with a blower fan in accordance with the present invention.

With reference to FIGS. 2 and 4, a quick adjusting flow system 2 includes the programmable controller 12, a motor drive controller 28 and a fan blower 30. The motor drive controller 28 is preferably a variable frequency drive, but other types of motor drive controllers may also be used. A speed of the fan blower 30 generates a specific fluid flow rate in the duct 100. The fan blower 30 includes a fan motor 32 and fan blades 34. The motor drive controller 28 is used to drive the fan motor 32 of the fan blower 30. An output signal of the motor drive controller 28 controls the speed of the fan motor 32. A specific speed of the fan blower 30 generates a specific fluid flow rate in the duct 100. A specific control signal value from the programmable controller 12 is associated with the specific fluid flow rate generated by the fan blower 30. The programmable controller 12 includes a look-up table 36 and a fine-adjustment closed loop routine 38. The look-up table 36 associates the specific control signal value and the specific fluid flow rate. The specific control signal value from the programmable controller 12 is associated with the specific fluid flow rate generated by a speed of the fan motor 30. The speed of the fan blades 34 are associated with the specific fluid flow rate and the specific control signal value in the duct 100 by sampling flow rates at different control signal values during commissioning of the automated fluid flow system 2 to populate the look-up table 36. A desired fluid flow rate is entered into the programmable controller 12 through a controller interface 40. The look-up table 36 directs the programmable controller 12 to output the corresponding control signal value to the fan motor 32.

The fine-adjustment software loop routine 16, 38 preferably includes sampling the fluid flow rate and increasing or decreasing the control signal value to obtain the desired fluid flow rate with the rotation device or the motor drive controller 28. A differential pressure sensor 40 preferably measures the fluid flow rate in the duct 100, but other types of fluid flow sensors may also be used. The differential pressure sensor 42 outputs a value of current flow rate to the programmable controller 12. If the current fluid flow rate is the same as the desired fluid flow rate, no further adjustment to the control signal value is needed. If the flow rate is incorrect, then the fine-adjustment software loop routine 16, 38 in the programmable controller 12 is used to increase or decrease the control signal value to obtain the desired fluid flow rate. After the control signal value is changed, the programmable controller 12 receives an output from the differential pressure sensor 42. If the current fluid flow rate is the same as the desired fluid flow rate, no further adjustment to the control signal value is needed.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A method of adjusting a fluid flow to a desired flow rate, comprising the steps of: providing an angularly adjustable damper having a rotation device and a damper blade, said damper blade is attached to an output shaft of said rotation device; providing a programmable controller having a plurality of fluid flow rates and a fine adjustment routine, each one of said plurality of fluid flow rates is associated with a specific control signal value, each said specific control signal value corresponds to a specific angle of said damper blade; utilizing a corresponding control signal value from said programmable controller when a flow rate is entered, said corresponding control signal value does not use input or aid from a fluid flow measurement of a current flow rate, rotating said damper blade with said corresponding control signal value to a new angle; and reading a value of pressure from at least one pressure sensor with said fine-adjustment software routine to determine an actual flow rate after setting said damper blade to said new angle, said rotation device increasing or decreasing said corresponding control signal value if said actual fluid flow rate is not the desired fluid flow rate.

2. The method of adjusting fluid flow to a desired flow rate of claim 1, further comprising the step of:
    locating said angularly adjustable damper inside a duct.

3. The method of adjusting fluid flow to a desired flow rate of claim 1, further comprising the step of:
    entering one of said plurality of fluid flow rates into said programmable controller through a controller interface.

4. The method of adjusting fluid flow to a desired flow rate of claim 1, further comprising the step of:
    providing a modulating type of rotary actuator for said rotation device.

5. The method of adjusting fluid flow to a desired flow rate of claim 1, further comprising the step of:
    providing a differential type of pressure sensor for said at least one pressure sensor.

6. A method of adjusting a fluid flow to a desired flow rate, comprising the steps of: providing an angularly adjustable damper having a rotation device and a damper blade, said damper blade is attached to an output shaft of said rotation device; providing a programmable controller having a plurality of fluid flow rates and a fine adjustment routine, each one of said plurality of fluid flow rates is associated with a specific control signal value in a data table or a formula during a commissioning of a duct system, each said specific control signal value corresponds to a specific angle of said damper blade; utilizing a corresponding control signal value from said data table or said formula when a flow rate is entered, said corresponding control signal value does not use input or aid from a fluid flow measurement of a current flow rate, rotating said damper blade with said corresponding control signal value to a new angle; and reading a value of pressure from at least one pressure sensor with said fine-adjustment software routine to determine an actual flow rate after setting said damper blade to said new angle, said rotation device increasing or decreasing said corresponding control signal value if said actual fluid flow rate is not the desired fluid flow rate.

7. The method of adjusting fluid flow to a desired flow rate of claim 6, further comprising the step of:
locating said angularly adjustable damper inside a duct.

8. The method of adjusting fluid flow to a desired flow rate of claim 6, further comprising the step of:
entering one of said plurality of fluid flow rates into said programmable controller through a controller interface.

9. The method of adjusting fluid flow to a desired flow rate of claim 6, further comprising the step of:
providing a modulating type of rotary actuator for said rotation device.

10. The method of adjusting fluid flow to a desired flow rate of claim 6, further comprising the step of:
providing a differential type of pressure sensor for said at least one pressure sensor.

11. A method of adjusting a fluid flow to a desired flow rate, comprising the steps of: providing an angularly adjustable damper having a rotation device and a damper blade, said damper blade is attached to an output shaft of said rotation device; providing a programmable controller having a plurality of fluid flow rates and a fine adjustment routine, each one of said plurality of fluid flow rates is associated with a specific control signal value during a commissioning of a duct system, each said specific control signal value corresponds to a specific angle of said damper blade; utilizing a corresponding control signal value from said programmable controller when a flow rate is entered, said corresponding control signal value does not use input or aid from a fluid flow measurement of a current flow rate, rotating said damper blade with said corresponding control signal value to a new angle; and reading a value of pressure from at least one pressure sensor with said fine-adjustment software routine to determine an actual flow rate after setting said damper blade to said new angle, said rotation device increasing or decreasing said corresponding control signal value if said actual fluid flow rate is not the desired fluid flow rate.

12. The method of adjusting fluid flow to a desired flow rate of claim 11, further comprising the step of:
locating said angularly adjustable damper inside a duct.

13. The method of adjusting fluid flow to a desired flow rate of claim 11, further comprising the step of:
entering one of said plurality of fluid flow rates into said programmable controller through a controller interface.

14. The method of adjusting fluid flow to a desired flow rate of claim 11, further comprising the step of:
providing a modulating type of rotary actuator for said rotation device.

15. The method of adjusting fluid flow to a desired flow rate of claim 11, further comprising the step of:
providing a differential type of pressure sensor for said at least one pressure sensor.

\* \* \* \* \*